(12) United States Patent  
Grosjean (10) Patent No.: US 8,240,409 B2  
(45) Date of Patent: Aug. 14, 2012

(54) SELF-PROPELLED HIGH-CLEARANCE VEHICLE

(75) Inventor: Rene Grosjean, Peronne (FR)

(73) Assignee: SARL Grosjean Rene Viticole, Lugny (FR)

( * ) Notice: Subject to any disclaimer, the term of this patent is extended or adjusted under 35 U.S.C. 154(b) by 119 days.

(21) Appl. No.: 12/824,686

(22) Filed: Jun. 28, 2010

(65) Prior Publication Data

US 2011/0024218 A1 Feb. 3, 2011

Related U.S. Application Data

(60) Provisional application No. 61/245,373, filed on Sep. 24, 2009.

(51) Int. Cl.  
*B62D 61/02* (2006.01)

(52) U.S. Cl. ................... 180/21; 180/209; 280/124.111

(58) Field of Classification Search ............. 180/21, 180/209, 235; 280/124.111, 400, 418, 755, 280/756, 757

See application file for complete search history.

(56) References Cited

U.S. PATENT DOCUMENTS

| 2,854,084 | A | * | 9/1958 | Isaac ............................. 180/209 |
| 3,426,720 | A | * | 2/1969 | Enos .......................... 440/12.66 |
| 3,700,059 | A | * | 10/1972 | Sutton ......................... 180/209 |
| 3,802,720 | A | * | 4/1974 | Ellis ............................ 280/755 |
| 4,041,672 | A | * | 8/1977 | Gularte ........................ 53/399 |
| 5,725,063 | A | * | 3/1998 | Ceragioli et al. ............ 180/14.4 |
| 6,695,328 | B2 | * | 2/2004 | Cope ..................... 280/124.111 |
| 7,044,251 | B2 | * | 5/2006 | Mast ............................. 180/209 |
| 7,784,812 | B1 | * | 8/2010 | Lares ........................... 280/474 |

FOREIGN PATENT DOCUMENTS

| FR | 2678888 | 1/1993 |
| FR | 2833561 | 6/2003 |

* cited by examiner

*Primary Examiner* — Joseph Rocca  
(74) *Attorney, Agent, or Firm* — Dennison, Schultz & MacDonald (57) ABSTRACT

A self-propelled high-clearance vehicle includes a front half-chassis and a rear half-chassis placed one behind the other and assembled together by a pivot connection, the front and rear half-chassis respectively including firstly a front wheel set and a rear wheel set disposed in line one behind the other along the longitudinal axis of the vehicle, and secondly a first stabilizer wheel set on the left and a second stabilizer wheel set on the right located on either side of the longitudinal axis of the high-clearance vehicle; a driver's cab mounted on one and/or the other of the half-chassis; and an engine unit for driving the vehicle, mounted on one and/or the other of the half-chassis.

11 Claims, 8 Drawing Sheets

SELF-PROPELLED HIGH-CLEARANCE VEHICLE

This application claims the benefit of U.S. Provisional Application 61/245,373 filed Sep. 24, 2009.

FIELD OF THE INVENTION

The present invention relates to the technical field of transport and work vehicles used in association with rows of crops that are of low, medium, or even tall heights.

BACKGROUND OF THE INVENTION

The subject matter of the invention thus relates to a self-propelled high-clearance vehicle adapted to advance between crop rows growing in ground that may in particular be irregular, while simultaneously performing various kinds of work relating to preparing the soil and to tending the crops.

In the state of the art, numerous solutions have been proposed for vehicles that are adapted to perform those functions while also being capable of advancing and accommodating irregularities of terrain.

For example, patent FR 2 560 143 describes a high-clearance tractor having a chassis in the form of an upside-down U-shape with a horizontal branch that is provided with a driver's cab and an engine unit. The horizontal beam is extended on either side by vertical legs, each provided with a rear wheel. Such a vehicle also has a crossbar hinged to the chassis and fitted with two stabilizer wheels, each situated substantially in line with a respective one of the rear wheels. The dimensions of the chassis and of the crossbar are adapted so that the driver's cab is positioned between two crop rows, while the wheels take up positions on either side of the two crop rows. Although such a vehicle enables the stabilizer wheels to move in a plane extending transversely relative to the vehicle in order to accommodate irregularities of terrain, it must be observed that the driver's cabin located at the top of the chassis constitutes a drawback concerning the general stability of the vehicle.

OBJECT AND SUMMARY OF THE INVENTION

The object of the invention is to remedy the drawbacks of the state of the art by proposing a self-propelled high-clearance vehicle that is designed to enable two crop rows to be straddled and that is provided with a driver's cab offering maximum visibility and safety while enabling the vehicle to advance in complete safety over terrain that presents various irregularities or grades.

Another object of the invention is to propose a novel self-propelled high-clearance vehicle of universal or standard nature that is suitable for being used to perform most of the work involved in preparing the soil and tending crops in rows.

To achieve such objects, the self-propelled high-clearance vehicle comprises:
 a front half-chassis and a rear half-chassis placed one behind the other and assembled together by a pivot connection, the half-chassis respectively including firstly a front wheel set and a rear wheel set disposed in line one behind the other along the longitudinal axis of the vehicle, and secondly a first stabilizer wheel set on the left and a second stabilizer wheel set on the right located on either side of the longitudinal axis of the high-clearance vehicle;
 a driver's cab mounted on one and/or the other of the half-chassis; and
 an engine unit for driving the vehicle, mounted on one and/or the other of the half-chassis.

In a preferred embodiment, the pivot connection comprises a pivot shaft extending in a direction that coincides with the longitudinal axis and co-operating with a bearing carried by the bottom portion of one of the half-chassis, the other half-chassis being provided with the pivot shaft.

Advantageously, each half-chassis is in the form of an upside-down U-shaped portal comprising a link branch between an outer leg for supporting a stabilizer wheel set and a central structure provided with a wheel set.

For example, the central structure of one half-chassis is provided with a driver's cab, while the central structure of the other half-chassis is provided with the driving engine unit.

In a preferred embodiment, the high-clearance vehicle includes a force-takeup device disposed between the link branches of the half-chassis.

For example, the force-takeup device comprises a friction pin carried by one of the central structures of one of the half-chassis and engaged to bear in a slideway presenting a circular guide path centered on the pivot axis of the pivot connection.

Advantageously, between its leg and the adjacent central structure, each portal defines a free passage for straddling a row of plants, the passages being located on either side of the longitudinal axis of the vehicle.

In a preferred embodiment, the link branch of each portal is adjustable in spacing to adjust the spacing between the outer leg and the adjacent central structure.

Advantageously, the stabilizer wheel sets are mounted in symmetrically opposite manner about the longitudinal axis of the vehicle;

For example, each of the front and rear and left and right stabilizer wheel sets comprises at least one wheel.

According to a characteristic of the invention, the front and rear wheel sets are steerable.

BRIEF DESCRIPTION OF THE DRAWINGS

Various other characteristics appear from the following description made with reference to the accompanying drawings that show, as non-limiting examples, embodiments of the subject matter of the invention.

MORE DETAILED DESCRIPTION

As can be seen in FIGS. 1 to 5, the subject matter of the invention relates to a self-propelled high-clearance vehicle 1 adapted to work astride two rows 2 of in-line crops of any type. The self-propelled high-clearance vehicle 1 has an engine unit 3 and a driver's cab 4 situated between the two crop rows 2 straddled by the self-propelled high-clearance vehicle 1.

The self-propelled high-clearance vehicle 1 has a front half-chassis 5 and a rear half-chassis 6 disposed one behind the other while being assembled together via a pivot connection 8 that enables the half-chassis 5 and 6 to pivot or tilt relative to each other, as explained in detail in the description below.

The front half-chassis 5 has a front wheel set 51 and a first stabilizer wheel set 52 located, in the example shown, on the left relative to the forward travel direction of the self-propelled high-clearance vehicle 1 as represented by arrow $F_1$. Similarly, the rear half-chassis 6 has a rear wheel set 61 and a second stabilizer wheel set 62 located on the right in the example shown. In general, the front half-chassis 5 includes a front wheel set 51 and a stabilizer wheel set 52 situated on one side of the vehicle, while the rear half-chassis 6 has a rear wheel set 61 and a stabilizer wheel set 62 situated on the other side of the vehicle.

In a preferred embodiment shown in the figure, each of the front, rear, and left and right stabilizer wheel sets 51, 61, 52, and 62 comprises one wheel mounted on an axle 9 carried by the corresponding half-chassis 5, 6. Naturally, the wheel sets 51, 52, 61, 62 could include one or more wheels, or even crawler tracks.

Figure 6:
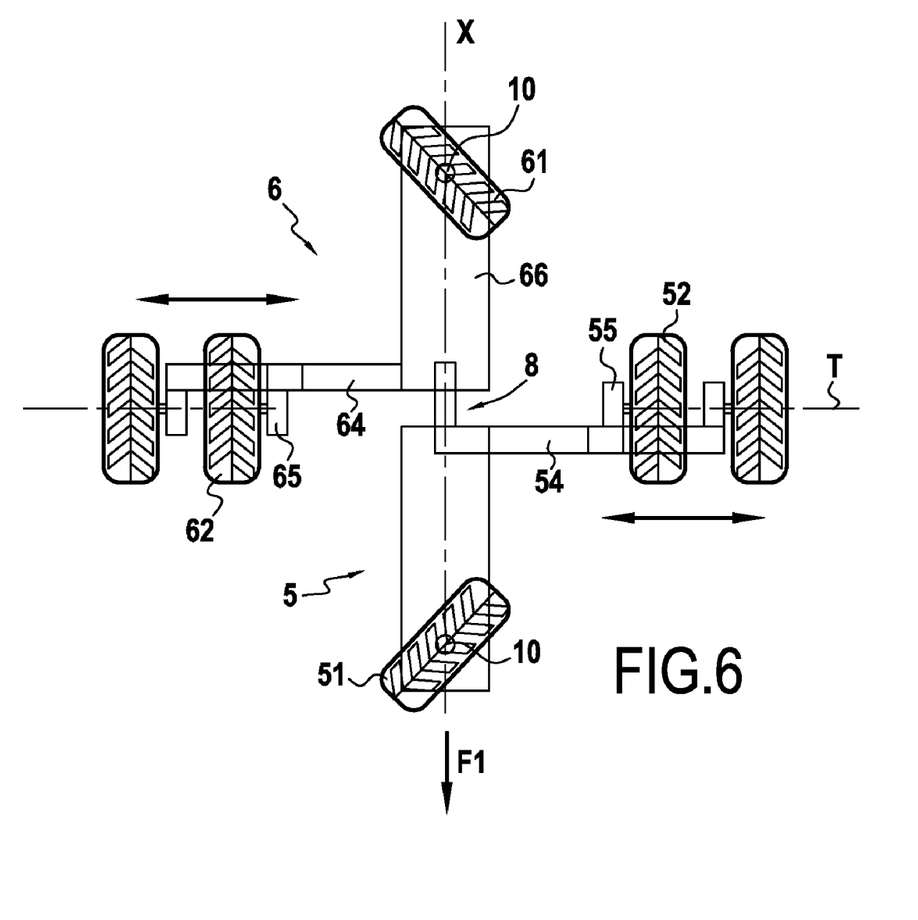
FIG. 6 is a simplified diagram for explaining the structure of the self-propelled high-clearance vehicle in accordance with the invention.

According to an embodiment characteristic, the front and rear wheel sets 51 and 61 are steerable. Thus, the front and rear wheel sets 51 and 61 are hinged about respective vertical pivots 10 so as to enable to them to pivot in a vertical plane and present an angle relative to the vertical plane containing the longitudinal axis X of the high-clearance vehicle 1. As can be seen more clearly in FIG. 6, the front and rear wheel sets 51 and 61 are controlled to pivot in opposite directions from the cab 4 in order to steer the high-clearance vehicle 1 to left or to right. The way in which the wheel sets are mounted and the way in which they are controlled in steering, possibly in association with damper systems, are not described in greater detail since they are well known to the person skilled in the art and they do not specifically form part of the subject matter of the invention.

According to a characteristic of the invention, the front wheel set 51 and the rear wheel set 61 are disposed in line one behind the other so as to lie on the longitudinal axis X of the vehicle corresponding to the front-rear axis of the self-propelled high-clearance vehicle 1. The left stabilizer wheel set 52 and the right stabilizer wheel set 62 are disposed on opposite sides of the longitudinal axis X of the self-propelled high-clearance vehicle 1.

In a preferred embodiment, the right and left stabilizer wheel sets 62 and 52 are situated in the same vertical transverse plane T that is perpendicular to the longitudinal axis X.

According to another characteristic of the invention, the front half-chassis 5 appears, in a vertical plane, in the form of an upside-down U-shaped portal 53 having a link branch 54 extending between firstly an outer leg 55 for supporting the left stabilizer wheel set 52 and secondly a central structure 56 provided with the front wheel set 51. Similarly, the rear half-chassis 6 appears, in a vertical plane, in the form of an upside-down U-shaped portal 63 having a link branch 64 connected firstly to an outer leg 65 for supporting the right stabilizer wheel set 62 and secondly to a central structure 66 provided with the rear wheel set 61.

Figure 3:
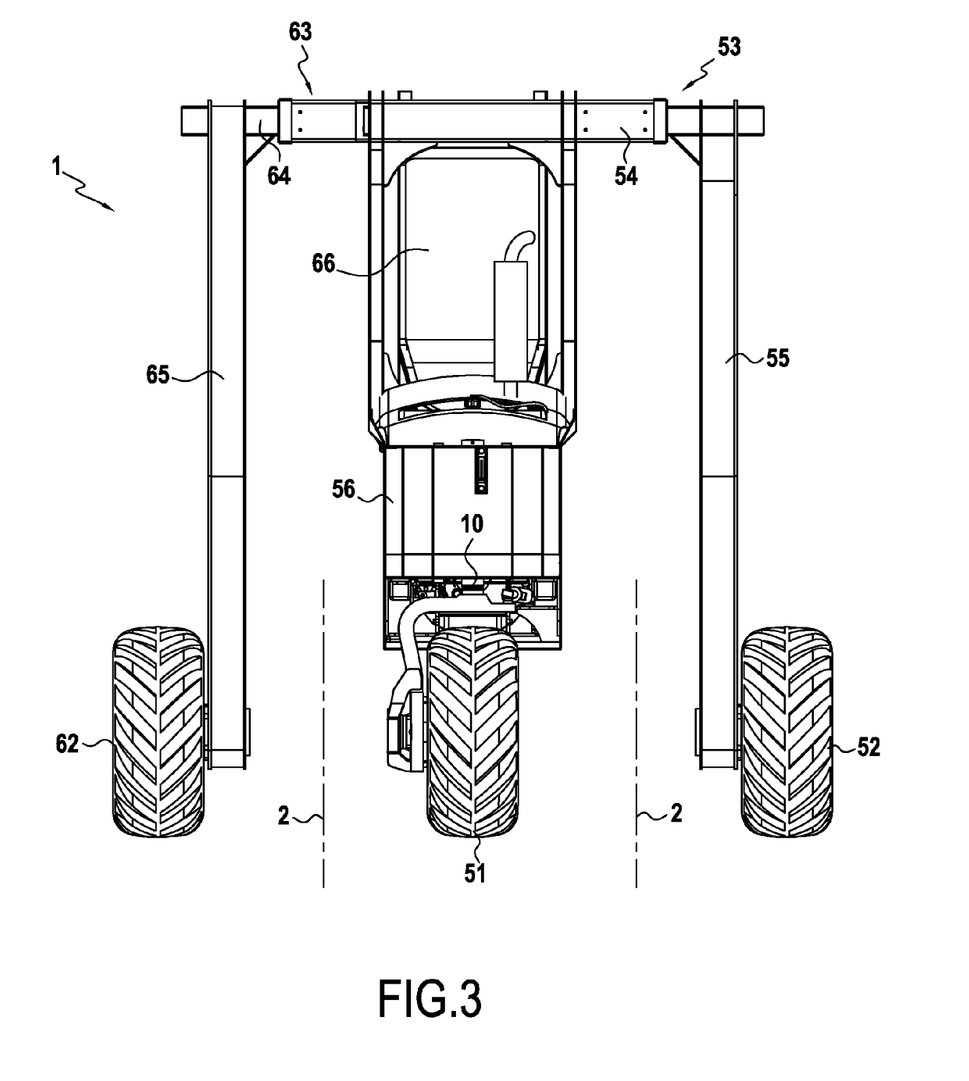
FIG. 3 is a front view of the self-propelled high-clearance vehicle in accordance with the invention.

As can be seen clearly in FIG. 3, each portal 53, 63 appears, in a vertical plane, in the form of an upside-down U-shape, each straddling a different crop row 2. The central structures 56 and 66 of the half-chassis 5, 6 are positioned one behind the other, being centered on the longitudinal axis X. In the example shown, the front half-chassis 5 has an outer leg 55 situated on the left-hand side of the high-clearance vehicle 1, while the outer leg 65 of the rear half-chassis 6 is situated on the right-hand side of the high-clearance vehicle 1. Naturally, the outer leg 55 of the front half-chassis 5, and consequently the first stabilizer wheel set 52, could be situated on the right-hand side with the outer leg 65 of the rear half-chassis 6, and consequently the second stabilizer wheel set 62 would then extend on the left-hand side.

According to a preferred embodiment characteristic, when the high-clearance vehicle 1 is running on flat ground (FIG. 3), the link branches 54, 64 extend horizontally at the same level. In other words, the link branches 54, 64 lie in a common horizontal plane situated at a determined distance from the ground corresponding to the maximum height of the crop rows 2 that they can straddle. Furthermore, as can be seen more clearly in FIG. 2, the link branches 54, 64 are offset relative to each other along the longitudinal axis X. Naturally, it is possible to envisage the link branches 54, 64 being substantially in alignment, transversely to the longitudinal axis X.

Each half-chassis 5, 6 is made up of various strength members, longitudinal members, or crossmembers optionally associated with protective or decorative covering depending on the associated functions. In the example shown, the rear half-chassis 6 is organized to present a driver's cab 4, while the front half-chassis 5 is adapted to have an engine unit 3 mounted thereon. Naturally, provision could be made to interchange the positions of the cab 4 and the engine unit 3 on the half-chassis 5 and 6. Similarly, it is possible to envisage that certain members, elements, or pieces of equipment of the cab 4 and/or of the engine unit 3 could be found on both of the half-chassis 5 and 6.

In the embodiment shown, the central structure 56 of the half-chassis 5 presents an elongate structure 57 supporting the engine unit 3 and having two connection arms 58 rising vertically to be connected to the link branch 54 of the portal. It should therefore considered that the portal 53 presents an upside-down U-shape in the vertical plane and is substantially L-shaped in the horizontal plane, with the central structure 57 extending forwards relative to the link branch 54 of the portal.

In the embodiment shown, the central structure 66 of the rear half-chassis 6 is arranged as a driver's cab 4. For this purpose, the central structure 66 is provided with a seat 67 that is surmounted, firstly at the rear by a link arch 68 extending up to the link branch 64, and secondly, at the front, by a windshield 69 that is supported by uprights 70 that are connected to the link branch 64. It should be observed that the seat 67 is at a low height above the ground, being located above the rear wheel set 61. The cab 4 is naturally fitted with driving controls and it is not described in greater detail insofar as it is well known to the person skilled the art and does not specifically form part of the subject matter of the invention.

As mentioned above, the left and right stabilizer wheel sets 52 and 62 are disposed in symmetrically opposite manner relative to the longitudinal axis X of the self-propelled high-clearance vehicle 1. In other words, and as can be seen more clearly in FIG. 2, the left and right stabilizer wheel sets 52 and 62 lie on a common transverse axis perpendicular relative to the longitudinal axis X.

Figure 1:
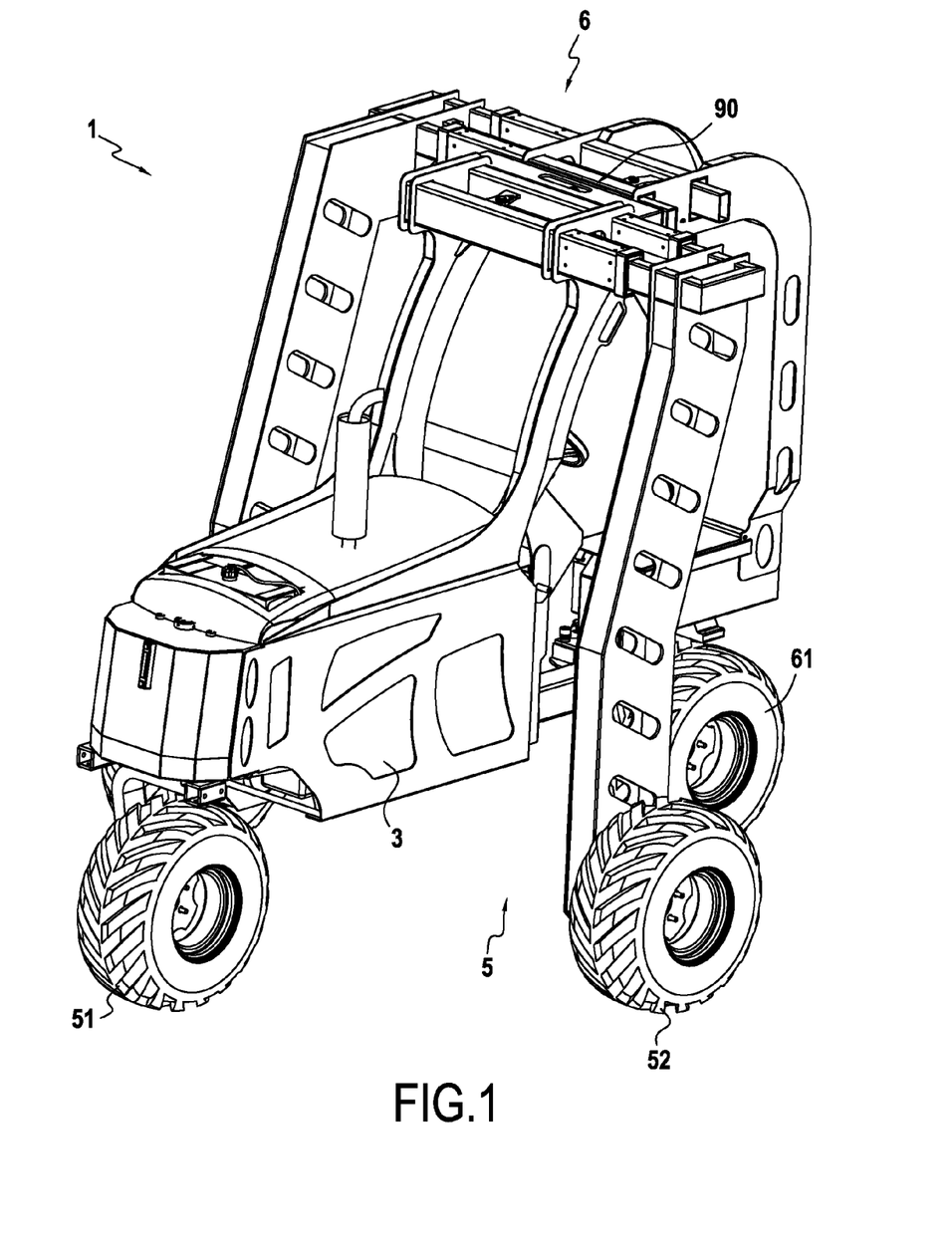
FIG. 1 is a three-quarters front perspective view showing an embodiment of a self-propelled high-clearance vehicle in accordance with the invention.
Figure 2:
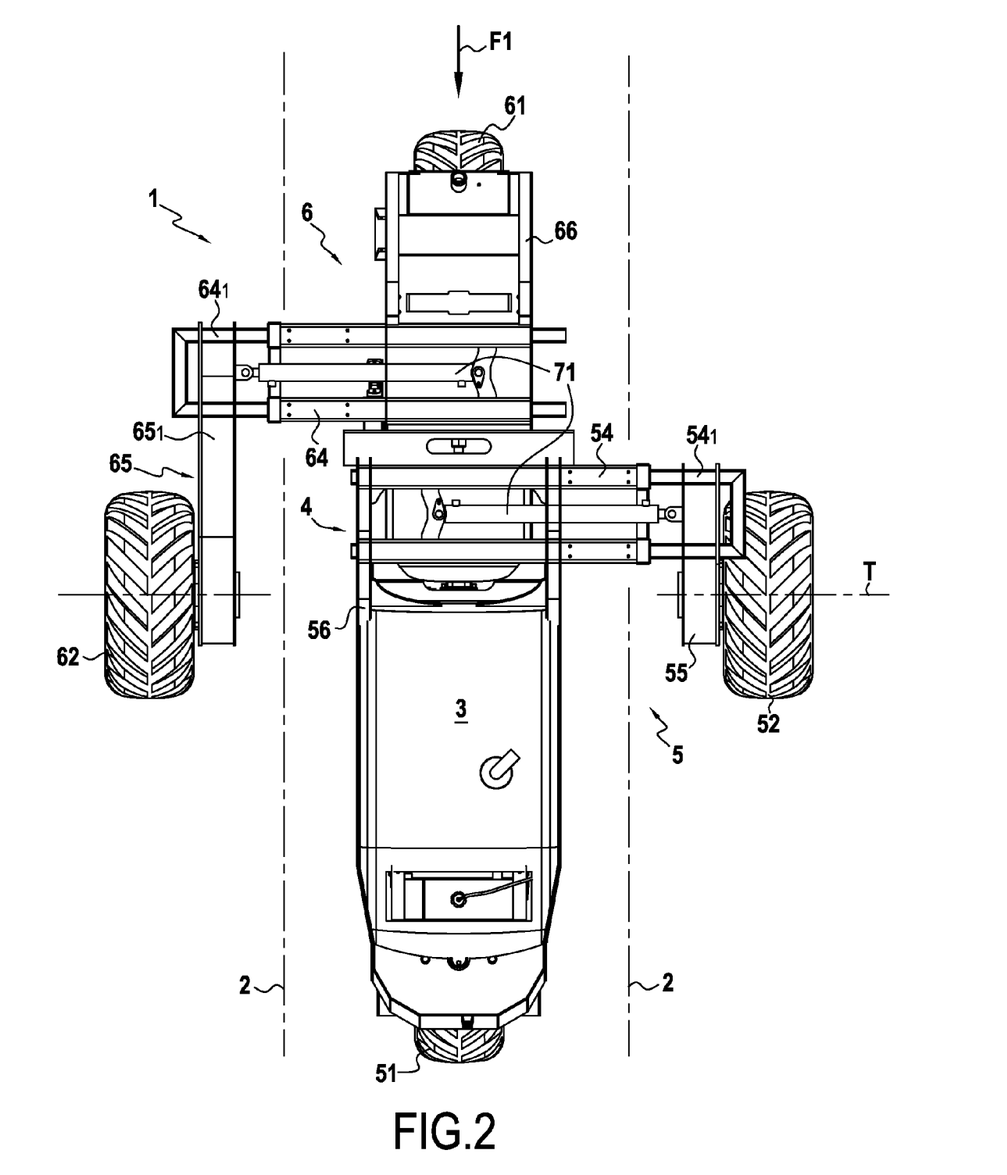
FIG. 2 is a plan view of the self-propelled high-clearance vehicle in accordance with the invention.

In order to enable the axles of the left and right stabilizer wheel sets 52 and 62 to be mounted in alignment, one and/or the other of the outer legs 55, 65 presents a shape or profile extending in a vertical plane parallel to the front-rear plane of the high-clearance vehicle 1. As can be seen in FIG. 2, the outer leg 65 presents a straight portion $65_1$ extending towards the front of the high-clearance vehicle so that the right stabilizer wheel set 62 is offset forwards relative to the link branch 64, along the longitudinal axis X. It should be observed that each outer leg 55, 65 may be provided with a system that enables its length to be adjusted.

According to an advantageous embodiment characteristic, each portal 53, 63 includes a system enabling the spacing of the outer leg 55, 65 relative to the adjacent central structure 56, 66 to be adjusted. Such a system enables the track width of the vehicle to be adjusted so that it can be matched to the width of the rows 2 of plants that it straddles. For example, each link branch 54, 64 has a stationary portion extending from the central structure 56, 66 and a sliding or telescopic portion 54₁, 64₁ engaged in the stationary portion. The sliding portion 54₁, 64₁ with which an outer leg 55, 65 is provided can be moved by an actuator member 71 such as a hydraulic actuator serving to move the leg 55, 65 in a transverse direction perpendicular to the longitudinal direction X of the high-clearance vehicle.

Figure 4:
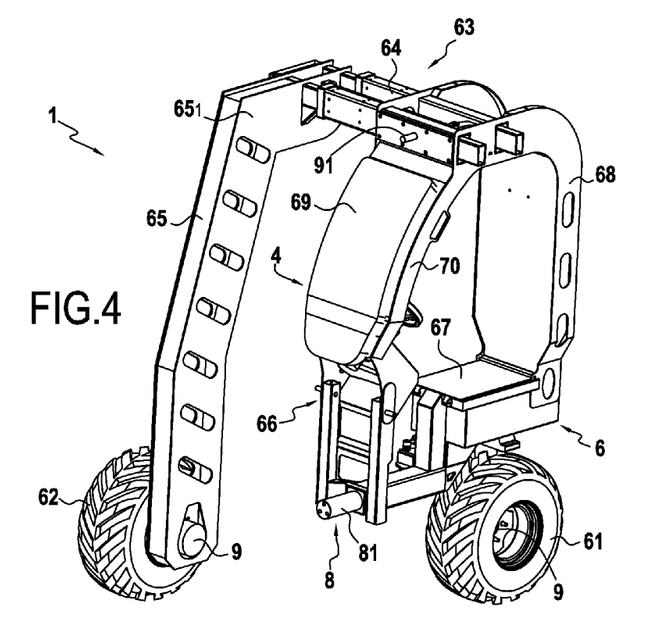
FIGS. 4 and 5 are respectively views of the front and rear half-chassis constituting the self-propelled high-clearance vehicle in accordance with the invention.
Figure 5:
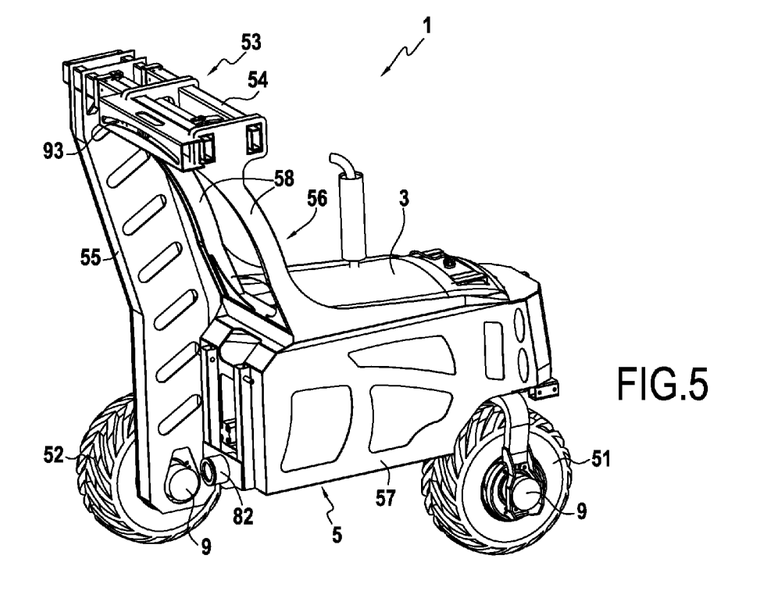

As can be seen more clearly in FIGS. 4 and 5, the pivot connection 8 comprises a pivot shaft 81 carried by one of the half-chassis and co-operating with a bearing 82 carried by the other half-chassis. In the embodiment shown, the pivot shaft 81 is carried by the rear half-chassis 6 and the bearing 82 is carried by the front half-chassis 5. More precisely, the pivot shaft 81 extends from the front and advantageously from a bottom portion of the central structure 66, while the bearing 82 extends from the rear and from a bottom portion of the central structure 56. Naturally, it is possible to envisage inverting the positioning of the pivot shaft 81 and the bearing 82 on the half-chassis 5 and 6. Similarly, the pivot connection 8 could be made in some other way using any suitable technical means for allowing the half-chassis 5 and 6 to pivot relative to each other. For example, the pivot connection 8 may include other members suitable for defining a virtual axis of rotation between the half-chassis 5 and 6.

In the embodiment shown, the pivot shaft 81 extends in a direction that coincides with the longitudinal axis X of the vehicle. Such an arrangement enables the half-chassis 5 and 6 to be hinged relative to each other in a transverse vertical plane so that they can adapt to irregularities of the terrain on which the self-propelled high-clearance vehicle 1 is advancing, as is described in greater detail below.

From the above description, it can be seen that each half-chassis 5, 6 is in three-point equilibrium, i.e. on a front or rear wheel set, on a stabilizer wheel set, and on the pivot connection.

According to a preferred embodiment characteristic, the self-propelled high-clearance vehicle 1 also has a force-takeup device 90 for taking up the forces that occur during pivoting about the pivot connection 8 and that act between the front and rear half-chassis 5 and 6. In the example shown the force-takeup device 90 is disposed between the central structures 56, 66 of the half-chassis 5 and 6, and preferably, but not exclusively, in the top portions of the central structures 56, 66.

For example, the force-takeup device 90 comprises a friction pin 91 extending parallel to the shaft 81 and carried by one of the central structures 56, 66, e.g. the central structure 66 of the rear half-chassis 6 in the example shown. Advantageously, the friction pin 91 and the pivot shaft 81 lie in the front-rear vertical plane of the high-clearance vehicle 1, and they are preferably spaced as far apart as possible. The friction pin 91 is engaged to bear against the inside of a slideway 93 formed in the central structure 56 of the front half-chassis 5. The slideway 93 presents a guide path on a circle that is centered on the pivot shaft 81 of the pivot connection 8. Preferably, this slideway 93 includes material for enhancing friction against the friction pin 91.

It can be seen from the above description that the self-propelled high-clearance vehicle 1 of the invention can straddle two crop rows 2 simultaneously while ensuring visibility and safety for the driver's cabin 4 and also while ensuring that the vehicle is stable, even when advancing on irregular ground.

When the self-propelled high-clearance vehicle 1 is advancing on flat ground, as shown for example in FIG. 3, the link branches 54, 64 of the two portals 53, 63 extend in substantially horizontal manner so that the front and rear wheels 51 and 61 are in alignment one behind the other and occupy substantially the same vertical plane. Likewise, the left and right stabilizer wheels 52 and 62 both extend vertically and they are parallel to each other.

Figure 7:
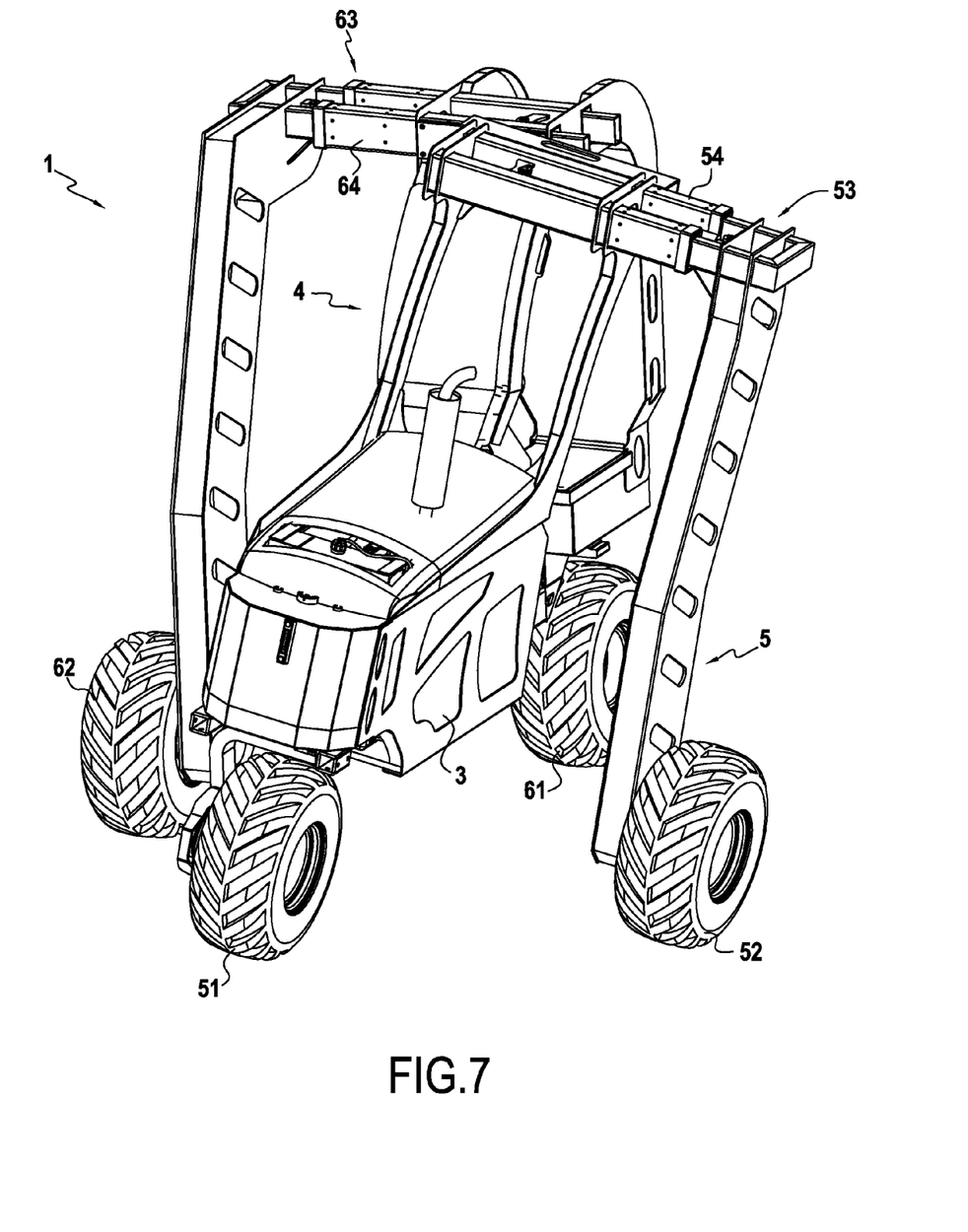
FIGS. 7 to 9 are views showing different positions of the self-propelled high-clearance vehicle on different configurations of ground.

When the vehicle 1 is advancing on terrain where the left stabilizer wheel 52 is at a level that is lower than the remainder of the vehicle, as shown in FIG. 7, then the front half-chassis 5 pivots about the pivot connection 8. As a result the portal 53 tilts to the left so that the left stabilizer wheel 52 remains in contact with the ground. Simultaneously, the front wheel 51 is pivoted in the same direction.

Naturally, the same phenomenon can be obtained when the right stabilizer wheel 62 is advancing on ground at a level that is lower than that of the other wheels of the vehicle.

Figure 8:
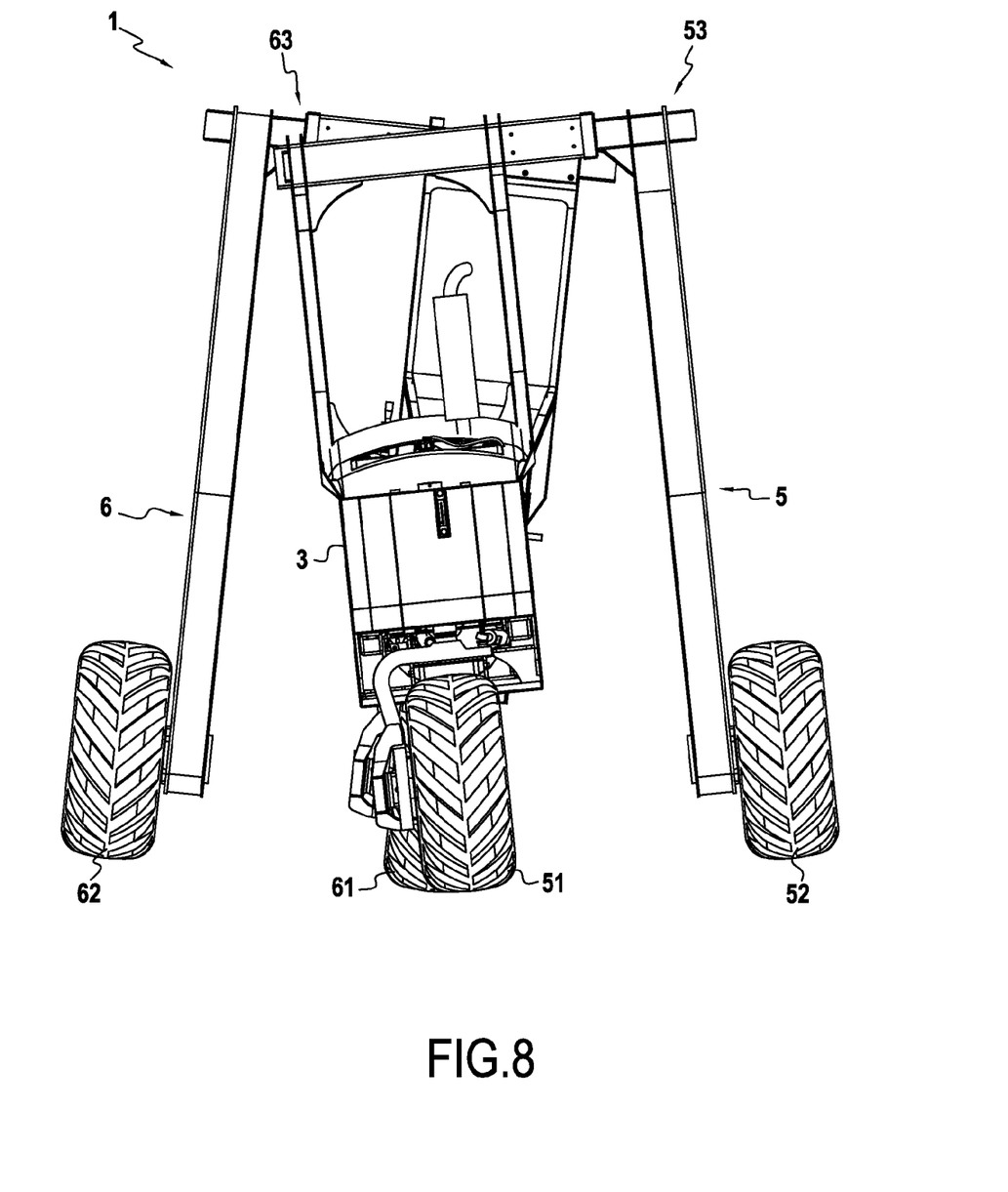

FIG. 8 shows another example of a running condition in which the self-propelled high-clearance vehicle 1 is advancing on terrain while passing over bumps to the right and to left of the vehicle. Under such circumstances, both half-chassis 5 and 6 pivot about the pivot connection 8 in opposite directions, thereby raising the stabilizer wheels 52, 62. Simultaneously, the front and rear wheels 51 and 61 tilt in opposite directions relative to the front-rear vertical plane.

Figure 9:
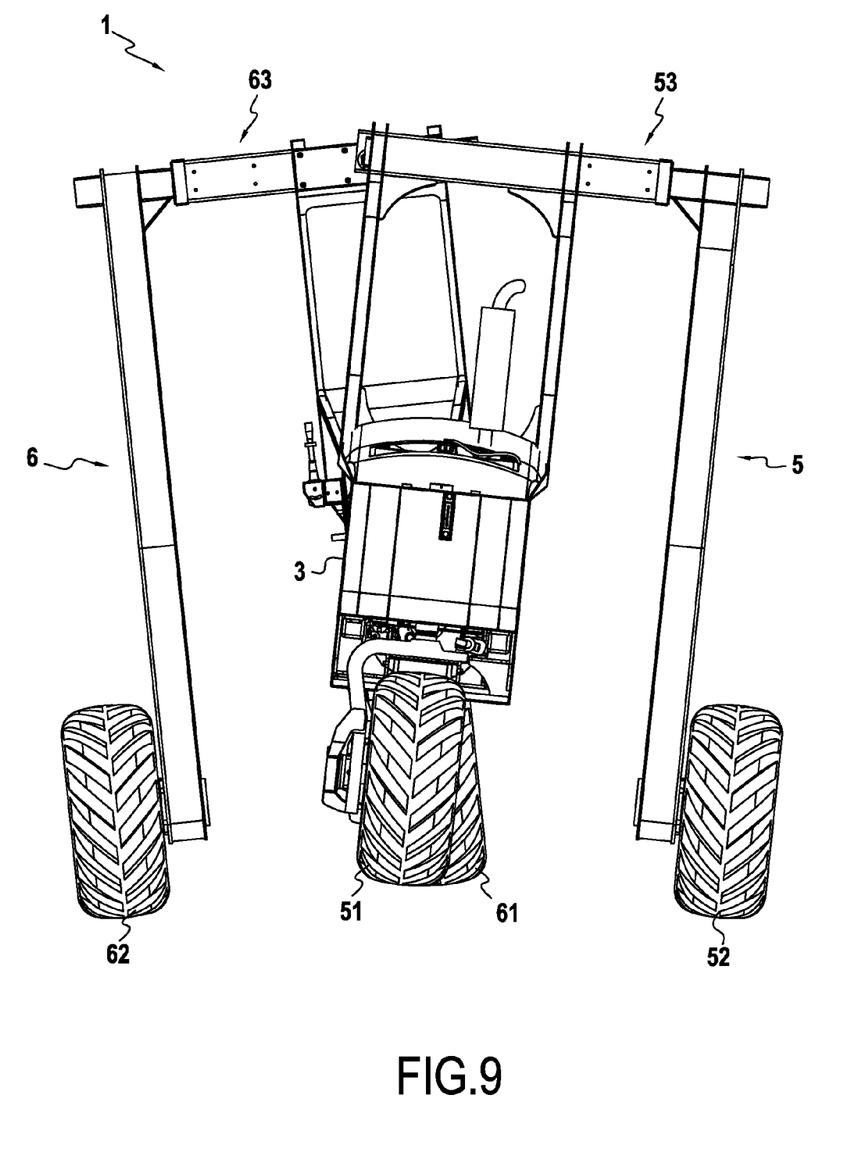

FIG. 9 shows another example of a running condition in which the self-propelled high-clearance vehicle 1 is advancing on terrain with the stabilizer wheels 52, 62 both being in depressions. Under such circumstances, the half-chassis 5 and 6 pivot downwards relative to each other such that the stabilizer wheels 52, 62 remain continuously in contact with the terrain. Simultaneously, the lowering of the portals 53, 63 outwards from the high-clearance vehicle 1 leads to the front and rear wheels 51 and 61 being inclined in opposite directions relative to the front-rear vertical plane.

It can be seen from the above description that the self-propelled high-clearance vehicle 1 of the invention is capable of remaining in contact with the ground regardless of varying running conditions. The high-clearance vehicle 1 is thus suitable for undertaking most of the work involved with preparing the ground and tending crops in rows. For this purpose, the half-chassis 5 and 6 are designed to be provided with various pieces of equipment enabling the soil to be tilled and enabling crops to be tended. For example, the portals 53, 63 are provided with tool carriers or fastener systems enabling pieces of equipment or tools to be fastened thereto, e.g. in temporary manner, depending on the work that is to be carried out.

It should be considered that the high-clearance vehicle 1 of the invention is of a universal nature for carrying out in complete safety and with good visibility nearly all of the work that is required on crops in rows, regardless of the height of the crops and regardless of the spacing between the crop rows. In this respect, it should be observed in the example shown that the link branches 54 and 64 of the portals extend from the tops of the central structures 56, 66 and in particular from above the driver's cab 4, so as to maximize the height available for straddling crop rows. Naturally, it may be envisaged that the link branches 54, 64 extend from the central structures 56, 66 at a level that is lower than the tops of said central structures.

It should be observed that in the example shown, the shaft 81 of the pivot connection 8 extends along the longitudinal axis X of the high-clearance vehicle. It should be observed that the pivot connection 8 between the half-chassis 5, 6 could extend in some other direction, for example perpendicularly to the longitudinal axis X. Under such circumstances, the half-chassis 5 and 6 pivot in the longitudinal vertical plane of the high-clearance vehicle 1.

The invention is not limited to the examples described and shown since various modifications can be applied thereto without going beyond the ambit of the invention.

What is claimed is:

1. A self-propelled high-clearance vehicle, comprising:
    a front half-chassis and a rear half-chassis placed one behind the other and connected by a pivot connection; wherein the front half-chassis includes a front wheel set and the rear half-chassis includes a rear wheel set; and wherein the front wheel set and rear wheel set are disposed in line one behind the other along the longitudinal axis of the vehicle,
    a first stabilizer wheel set disposed on the front half-chassis
    a second stabilizer wheel set disposed on the rear half-chassis, wherein the first and second stabilizer wheel sets lie on a common transverse axis perpendicular relative to the longitudinal axis of the vehicle;
    a driver's cab mounted on one and/or the other of the half-chassis; and
    an engine unit for driving the vehicle, mounted on one and/or the other of the half-chassis;
    wherein the front half-chassis and the rear half-chassis are each in the form of an upside-down U-shaped portal comprising a link branch between an outer leg for supporting a stabilizer wheel set and a central structure provided with a wheel set.

2. A high-clearance vehicle according to claim 1, wherein the pivot connection comprises a pivot shaft extending in a direction that coincides with the longitudinal axis and co-operating with a bearing carried by the bottom portion of one of the half-chassis, the other half-chassis being provided with the pivot shaft.

3. A high-clearance vehicle according to claim 1, wherein the central structure of one half-chassis is provided with a driver's cab, while the central structure of the other half-chassis is provided with the driving engine unit.

4. A high-clearance vehicle according to claim 1, including a force-takeup device disposed between the link branches of the half-chassis.

5. A high-clearance vehicle according to claim 4, wherein the force-takeup device comprises a friction pin carried by one of the central structures of one of the half-chassis and engaged to bear in a slideway presenting a circular guide path centered on the pivot axis of the pivot connection, the slideway being arranged in the other central structure of the other half-chassis.

6. A high-clearance vehicle according to claim 1, wherein, between its leg and the adjacent central structure, each portal defines a free passage for straddling a row of plants, the passages being located on either side of the longitudinal axis of the vehicle.

7. A high-clearance vehicle according to claim 1, wherein the link branch of each portal is adjustable in spacing to adjust the spacing between the outer leg and the adjacent central structure.

8. A high-clearance vehicle according to claim 1, wherein the stabilizer wheel sets are mounted in symmetrically opposite manner about the longitudinal axis of the vehicle.

9. A high-clearance vehicle according to claim 1, wherein each outer leg is provided with a system enabling its length to be adjusted.

10. A high-clearance vehicle according to claim 1, wherein each of the front and rear and left and right stabilizer wheel sets comprises at least one wheel.

11. A high-clearance vehicle according to claim 10, wherein the front and rear wheel sets are steerable.

* * * * *